United States Patent

[11] 3,542,220

| [72] | Inventor | Robert L. Propst<br>Ann Arbor, Michigan |
|---|---|---|
| [21] | Appl. No. | 735,802 |
| [22] | Filed | June 10, 1968 |
| [45] | Patented | Nov. 24, 1970 |
| [73] | Assignee | Herman Miller, Inc.<br>Zeeland, Michigan<br>a corporation of Michigan |

[54] ARTICLE HANDLING CART AND CONTAINER THEREFOR
11 Claims, 9 Drawing Figs.

[52] U.S. Cl. ................................................. 214/38,
214/52; 220/38; 280/47.34, 280/79.2
[51] Int. Cl. ....................................................... B65g 67/02,
B62b 11/00
[50] Field of Search.......................................... 214/38.42,
52, 314, 515; 280/47.34, 79.2; 296/56; 220/38;
217/59

[56] References Cited
UNITED STATES PATENTS
1,105,464   7/1914   Stickler ........................   296/56

| 1,454,710 | 5/1923 | Drinkwater .................... | 280/47.34 |
| 2,166,561 | 7/1939 | Spiegl........................... | 214/52X |
| 3,262,714 | 7/1966 | Langone....................... | 280/79.2 |
| 3,214,035 | 10/1965 | Krausse et al................. | 214/314X |

FOREIGN PATENTS
1,328,018   4/1963   France .........................   214/38X

*Primary Examiner*—Robert G. Sheridan
*Attorney*—Price, Heneveld, Huizenga & Cooper ABSTRACT: This disclosure relates to an article handling cart and container for laundry and the like. The container has an open top and open front with a removable door at the front. The door is hinged at the top portion thereof and is removably latched at the bottom to permit the door to remain closed when desirable and to permit opening of the door from the bottom for dumping of the container. The container has a hook engaging means for lifting the container from the cart. Interengaging means between the container and cart prevent lateral movement of the container on the cart but permit the container to be removed from the cart by lifting and permit the container to be dumped by rotation of the cart about a horizontal axis.

Patented Nov. 24, 1970
3,542,220
Sheet 1 of 2
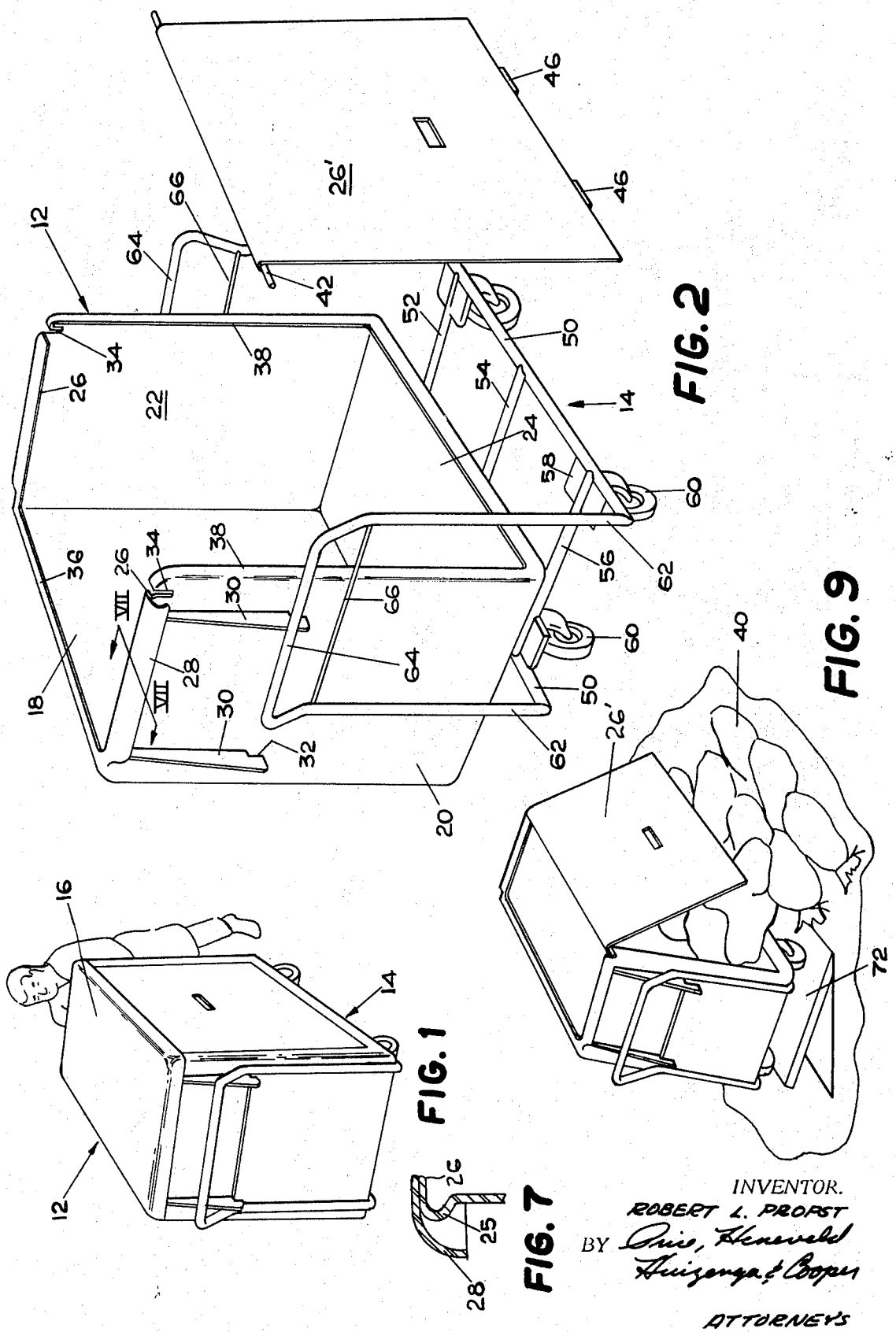
INVENTOR.
ROBERT L. PROPST
BY
ATTORNEYS

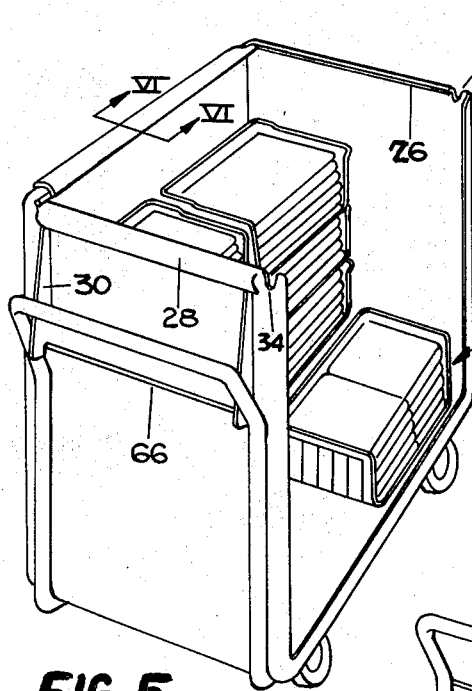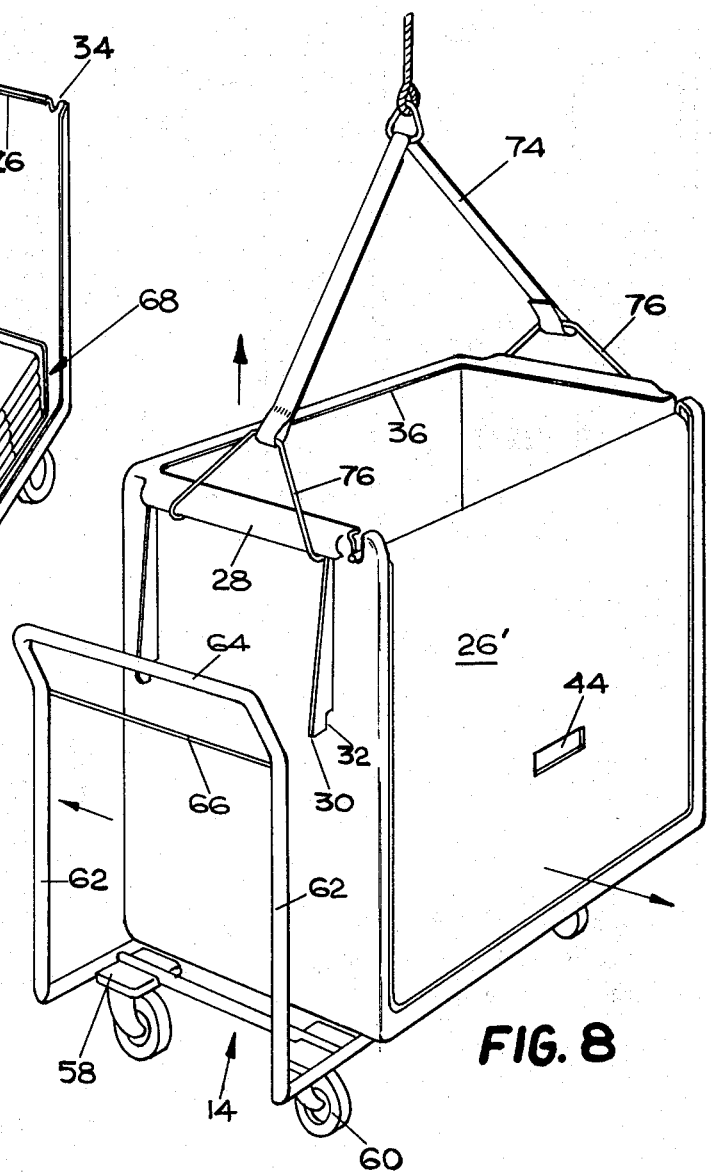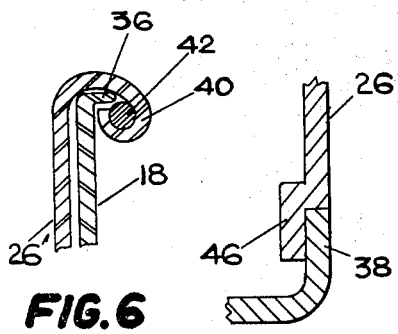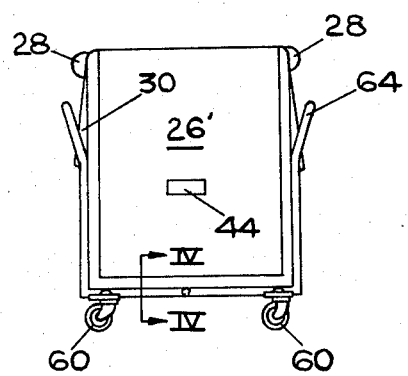

ARTICLE HANDLING CART AND CONTAINER THEREFOR

This invention relates to a cart and container therefor.

Hospital costs have increased rapidly in the last few years. New systems are required to reduce the cost while improving the sterility of the hospital.

Present hospital laundry practice is to remove soiled linen from rooms and collect it in a single bin. The linen in the bin is then collectively laundered and returned to the hospital for redistribution. This system tends to spread germs and requires that the soiled and clean linen be handled a number of times.

It has been suggested to containerize soiled linen from each room and to keep the soiled linens segregated until they are washed and sterilized. It has also been suggested to containerize clean linens to be supplied to each room in an effort to reduce the number of times the laundry is handled. Present equipment is not adequate to carry out this system.

I have now discovered an improved cart and container which can be used in hospitals for clean and soiled linen with improved sanitary conditions and reduced cost by providing a cart and container structure in which the cart and container are easily separable for washing and the container is a top loading and side unloading structure for more economical use. Further, the container can be dumped with or without the cart by rotation about a horizontal axis. A removable door is provided for easy unloading.

By various aspects of this invention, one or more of the following, or other, objects can be obtained.

It is an object of this invention to provide a container and cart for hospital laundry which can be used for both clean and soiled linens.

It is a further object of this invention to provide a top loading and side unloading container for linens and the like, and a cart for the container.

It is a still further object of this invention to provide a container with a removable side door and a cart support for the container in which the container can be dumped on the cart without sliding of the container off the cart.

It is a still further object of this invention to provide a container and cart for laundry and the like wherein the container is easily lifted from the cart but is restrained from lateral movement on the cart and from its dumping through a bottom portion of a side wall of the container.

Other aspects, objects, and the several advantages of this invention are apparent to one skilled in the art from a study of this disclosure, the drawings, and the appended claims.

According to the invention, there is provided a container and cart structure. The container has a back wall, a pair of oppositely disposed side walls, and a bottom joined together to form an open top, open front container. A removable door is hinged in the open front so that the door is rotatable about a top portion thereof to permit dumping of the cart through the bottom portion of the door. Preferably, releaseable latch means are provided at the bottom of the door to maintain the door in place as desired.

Container retaining and supporting means are provided on the cart to support the container in a manner so as to retain the container on the cart to prevent relative lateral movement between the container and the cart but to permit the container to be removed from the cart upon lifting of the container. Hook engaging means are provided on the top of the cart to permit the cart to be lifted from the container.

The container side walls and the upper portion of the door are so shaped as to permit storage of the door on the back wall of the container when the cart is being unloaded from the front.

The invention will now be described with reference to the accompanying drawings in which:

FIG. 1 is a perspective view of a cart and container according to the invention;

FIG. 2 is an exploded view of the cart and container shown in FIG. 1;

FIG. 3 is a front elevational view of the cart shown in FIGS. 1 and 2;

FIG. 4 is a partial sectional view along lines IV–IV of FIG. 3 showing the latch of the door;

FIG. 5 is a perspective view of the cart with the door removed, the cart having clean laundry and the door being stored on the back wall of the container;

FIG. 6 is a sectional view taken along lines VI–VI of FIG. 5;

FIG. 7 is a sectional view taken along lines VII–VII of FIG. 2 illustrating the hook engaging flange on the upper sides of the container;

FIG. 8 is a perspective view of the cart and container showing the removal of the container from the cart by a hoist; and FIG. 9 is a perspective view of the cart with loaded bags showing unloading of the container through the bottom of the door by rotation of the cart about a horizontal axis.

Referring now specifically to FIGS. 1 through 7, there is shown a container 12 and a cart 14. In FIG. 1, the container has a dust cover over the top thereof illustrating how the clean linen within the cart can be protected from dust and dirt. The container has a back wall 18, side walls 20 and 22, and a bottom wall 24 joined together to form the open top and open front container. The side walls have an outward bulb 25 at the top thereof and an inwardly extending lip 26 (FIG. 7). An outer downwardly curved flange 28 is welded to the top of inwardly extending lip 26 to provide a hook engaging means for the container. A pair of supporting flanges 30 are welded onto each side of the container. The supporting flanges 30 extend downwardly and outwardly and have an inner undercut slot 32 at the bottom thereof. Hinge slot 34 extends vertically downwardly from a top front portion of the side walls 20 and 22.

The back wall 18 has an inwardly extending lip 36 which joins the inwardly extending lip 26 to provide a strengthening rim at the top of the container.

An inwardly extending lip is formed continuously on the front of the container at the side walls and extends across the bottom 24. This continuous inwardly extending lip 38 strengthens the front of the container.

The door 26' has a rounded end 40 which envelops a rod 42. The ends of rod 42 fit within the hinged slots 34 to permit rotation of the door 26' about the rod 42. The rod is short enough to fit between the outward bulb 25 so as to permit the door to be hung on the back wall of the container, as illustrated in FIG. 5. When the door is stored on the back wall of the container, such as during unloading of the fresh linens from the container, the rounded end 40 will be positioned beneath the inwardly extending lip 36 of the back wall.

A handle hole 44 is provided in the door 26' to aid in removing and positioning the door. Offset latch flanges 46 are secured to the bottom of the door 26' so as to retain the door bottom in contact with the front of the container as desired (FIG. 4).

The cart 14 comprises bottom frame members 50 having cross members 52, 54, and 56. Pads 58 are welded to the bottom of cross members 52 and 56. Caster wheels 60 are operably affixed to the pads 58 so that the cart can roll on the wheels 60. The cart has upstanding side members 62 forming a handle 64 at the upper portion thereof. A crossbar member 66 is provided at an upper portion of the upstanding side members 62 for engaging the supporting flanges 30 of the container at slots 32. As illustrated at FIG. 3, the handle portion extends upwardly and outwardly at the bar 66 so that the handle portion 64 is spaced far enough away from the side of the container to permit the container to be raised and lowered onto the cart without having the flanges 30 strike the handle 64.

The flanges 30 are so spaced so as to fit snugly within the upstanding side members 62 to restrain the lateral movement between the cart and the container. Preferably, the container is at least partially supported by the bars 66 through the flanges 30.

The container and cart is advantageously used for supplying clean linen and collecting soiled linen. The clean linen can be supplied and dispensed in a manner illustrated in FIG. 5. The clean laundry can be positioned in individual trays 68 within the cart. While dispensing the linen, the door 26' can be removed and stored on the back wall 24 of the container. The laundry in the trays can then be quickly and economically dispensed by removing individual trays from the front of the container.

When it is desirable to use the cart to collect soiled linen, the door 26' is replaced on the front of the container with the rod 42 in slot 34 and the offset latch flanges 46 behind the lip 38. The soiled linen can be individually containerized in bags such as 70 (FIG. 9) and thrown into the container through the open top. When it is desirable to remove the bags from the container, the container can be lifted from the cart by a hoist comprising a hoist strap 74 and flange engaging hooks 76 in a manner illustrated in FIG. 8. After the container has been raised, the door 26' is lifted slightly upwardly and the container is easily tilted to dump the bags out of the bottom of the door 26'.

Alternately, the cart can be rolled onto a tilting platform 72 which rotates the cart about a horizontal axis. The container will be retained on the cart as illustrated in FIG. 9 through the interengagement of flanges 30 and upstanding side members 62. In this method of dumping the container, the door 26' must be raised slightly to disengage the offset latch flanges 46 so that the door can pivot about the rod 42 within the slots 34. To this end, the slots 34 can be longer than the offset lateral flanges 46 so that the rod will be retained within the slots 46 after the door has been lifted slightly above the point at which the latch flanges 46 will be disengaged from the lip 38.

With the easy removal of the container from the cart, the carts can be washed after collecting and dumping the soiled linen. Additionally, it will be realized that the cart and container can be used for supplying and collecting laundry in an economical manner. The same cart can be used for supplying linen and, when empty, can be used for returning soiled linen to the laundry. In this manner, trips of empty carts between the laundry and the rooms can be avoided.

Reasonable variation and modification are possible within the scope of the foregoing disclosure, the drawings, and the appended claims without departing from the spirit of the invention.

I claim:

1. An article handling cart with a removable container; said cart having a base frame, wheels operably fixed to the bottom of said base frame so as to permit the cart to roll on said wheels, a pair of side brace members extending upwardly from said base frame at opposite sides thereof, a handle member extending upwardly and outwardly of at least one pair of said side brace members, a container supporting means fixed to an upper portion of each pair of said side brace members; said container having sidewalls, a back wall, and a bottom wall joined together to form an open top, open front receptacle, means on said container depending from an upper portion of said side walls to engage said container support means, and thereby interlock said container and said cart so as to maintain said container fixed on said cart as said cart is rotated through an angle about a horizontal axis; said support engaging means being shaped to permit said container to be removed from said cart by lifting said container upwardly.

2. An article handling cart and container according to claim 1 wherein said container supporting means comprises a horizontal bar fixed between each pair of side brace members.

3. An article handling cart and container according to claim 2 wherein said interengaging means comprises at least two downwardly extending flanges projecting out from said sidewalls and spaced from each other a distance slightly less than said pair of side brace members on said cart so that said flanges fit snugly between said pair of side brace members, a downwardly opening slot at the bottom of said flanges adapted to fit over said horizontal bar, and said container being at least partially supported by said horizontal bar through said flanges.

4. An article handling cart and container according to claim 3 wherein said handle is formed from upward extensions of said side brace members, said upward extensions projecting upwardly and outwardly and then laterally at a top portion thereof to form said handles; said laterally extending handle portion being spaced a sufficient distance outwardly from said horizontal bar that said container can be raised upwardly relative to said cart without said flanges striking said laterally extending portion of said handle.

5. A container and cart structure for linens and the like comprising:
a container having a back wall, a pair of oppositely disposed sidewalls and a bottom joined together to form an open top, open front container;
a door in said open front;
means removably hinging said door and said container at a top front portion of said container to permit rotation of said door about said hinge so that said door opens at the bottom of said container;
a cart having a supporting base, and wheels operably fixed to said base to permit rolling of said cart; and
container retaining and supporting means on said cart to support said container in a manner so as to retain said container on said cart to prevent lateral relative movement between said container and said cart but to permit said container to be removed from said cart upon lifting up said container.

6. A container and cart structure according to claim 5 wherein said cart has open sides so that said container can be dumped by rotating said cart about an angle to discharge the contents of said container through the bottom of said door.

7. A container and cart structure according to claim 5 wherein said hinge means comprises a vertical slot in each sidewall at a top front portion thereof, and a pivot rod on the upper portion of said door projecting outwardly to be retained by said slots whereby said door can be removed from engagement with said container by lifting said door upwardly relative to said container.

8. A container and cart structure according to claim 7 wherein the sidewalls of said container extend outwardly and then inwardly at a top portion thereof, and said pivot rod is shorter than the outwardly extending portion of said container sidewalls, said door has a laterally extending lip curled about said rod, whereby said door can be removed from the front of said container and hung on the back of said container with the pivot rod between said outwardly extending portion and beneath said inwardly extending portion of said sidewalls 9. A container and cart structure according to claim 5 wherein releaseable latch means are provided at the bottom of said door to maintain said door bottom in contact with said container.

10. A container and cart structure according to claim 5 further comprising exterior hook engaging means at an upper portion of said sidewalls to permit said container to be raised from said cart and dumped by rotating the container about a horizontal axis to discharge the contents of said container through said door.

11. A container and cart structure according to claim 5 further comprising means at the top rear portion of said container for removably supporting said door at a back portion of said container whereby said door can be removed from said container and stored at a back portion thereof to permit access to said container through said open front for loading and unloading said container.